R. D. COOK.
ATTACHMENT FOR SHEARING MACHINES.
APPLICATION FILED JUNE 29, 1916.
1,214,430.
Patented Jan. 30, 1917.
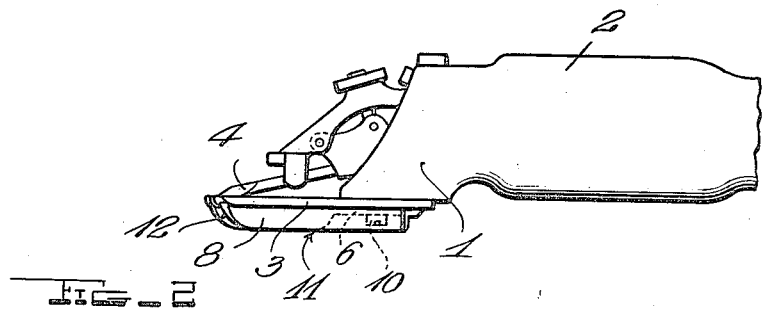
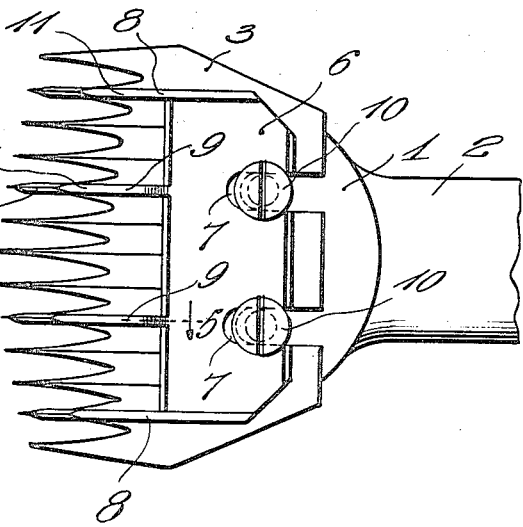
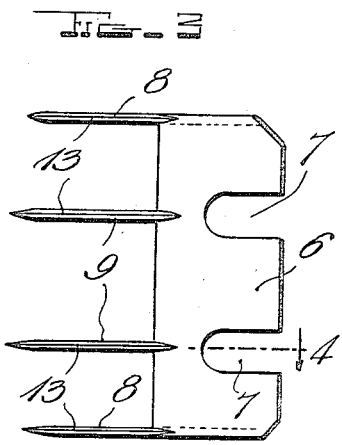
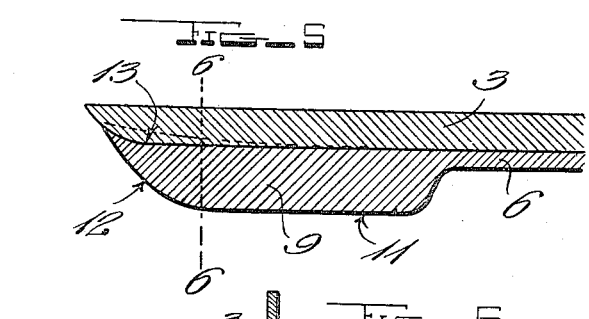
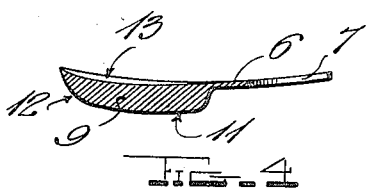
Witness
C. Cameron
Inventor
R. D. Cook
By H. B. Willson & Co.
Attorneys

UNITED STATES PATENT OFFICE.

RUSSELL D. COOK, OF SALT LAKE CITY, UTAH.

ATTACHMENT FOR SHEARING-MACHINES.

1,214,430.

Specification of Letters Patent.  Patented Jan. 30, 1917.

Application filed June 29, 1916. Serial No. 106,679.

*To all whom it may concern:*

Be it known that I, RUSSELL D. COOK, a citizen of the United States, residing at Salt Lake City, in the county of Salt Lake and State of Utah, have invented certain new and useful Improvements in Attachments for Shearing-Machines; and I do declare the following to be a full, clear, and exact description of the invention, such as will enable others skilled in the art to which it appertains to make and use the same.

This invention relates to improvements in shearing machines, and more particularly to attachments therefor.

The primary object of the invention is to provide an attachment for sheep shearing machines whereby the latter is kept from cutting the wool close to the skin of the animal. At certain seasons of the year it is particularly desirable to leave a rather long stubble so as to protect the animal from cold.

An additional object is to provide means on the attachment whereby the same may be secured to the shearing machine in such a manner that the wool of the animal will not become caught and pulled.

With these and many other objects in view, my invention resides in the novel features of construction and combination of parts which will be hereinafter more particularly described and claimed.

In the accompanying drawings: Figure 1 is a side elevation of the head of a sheep shearing machine showing my attachment applied to the cutting mechanism thereof; Fig. 2 is a bottom plan view of the parts shown in Fig. 1, the attachment being also shown in bottom plan view; Fig. 3 is a top plan view of the attachment removed; Fig. 4 is a transverse section on the line 4—4 of Fig. 3; Fig. 5 is a similar view on the line 5—5 of Fig. 2; and Fig. 6 is a detail transverse section on the plane of the line 6—6 of Fig. 5.

Referring more particularly to the drawings, the numeral 1 designates the head of a shearing machine fixed to one end of a shank 2 which forms a handle by means of which the device is held when in operation. The cutting means is mounted on this head and comprises a stationary cutter 3 and an oscillatory cutter 4. The movable cutter 4 is caused to oscillate back and forth on the stationary cutter by suitable oscillating mechanism, not shown, which mechanism may consist of any of the well known forms of devices operated either by compressed air, by a flexible shaft, or by hand. The teeth of the stationary cutter or comb 3 have their lower bottom edges reduced until they are very thin as is customary in sheep shearing machines of this character, this configuration being shown clearly in Fig. 6 of the drawings.

The attachment which is to be applied to the ordinary shearing machine just described consists of an attaching plate 6 having a pair of spaced apart slots 7 formed therein and opening through the rear edge thereof, and a plurality of fins 8 and 9. The slots 7 are adapted to receive the shanks of clamping screws 10 which depend from the underside of the stationary cutter or comb 3 in order that the attachment may be secured to the machine, it being obvious that by providing slots which open through one edge of the plate, the device may readily be applied to the machine and adjusted thereon. The fins 8 are in the present instance two in number and one is disposed at each end edge of the plate 6 and formed integrally therewith. These fins preferably also project forwardly from the front edge of the plate a distance substantially equal to the width of said plate as shown in Fig. 3. The other fins 9 are also two in number and are disposed between the other first mentioned fins 8 and project forwardly from the front ends of the plate, they also being formed integrally with the latter. Both sets of fins depend below the bottom of the plate 6 and have their bottoms flattened as at 11 and disposed in the same horizontal plane, their extreme front ends being slightly rounded as shown at 12. Thus, when the attachment has been applied to the underside of the comb 3 by means of the clamping screws 10 and the machine operated in the usual manner, the wool of the sheep may be so cut as to leave a rather long stubble for various reasons.

During the operation, the flat bottoms of the fins 8 and 9 contact with the skin of the animal so that the movable and stationary cutters of the machine will at all times be spaced the same distance away from the animal's body. On the other hand, when wool is to be cut short, the attachment is removed by loosening the screws 10. In ordinary attachments which are provided for accomplishing the same purpose, the wool of the sheep catches between the top of the fins and the underside of the comb 3, and thus preventing successful operation of the machine. In order to overcome this difficulty, I have provided the upper edge of each of the fins 8 and 9 of my attachment with a longitudinally extending groove 13, those in the fins 9 extending throughout their length, while those in the fins 8 are formed only in a portion of their length. Since the fins are so disposed on the plate 6 as to engage the underside of a number of the comb teeth, and as the latter are very thin, they will be disposed within the groove 13. When the attachment is clamped to the comb, the bottom edges of the comb-teeth will be retained in the groove and effectively prevent the wool from getting between the teeth and the fins. In order, however, to more effectively bind the fins into engagement with the bottom of the comb-teeth, the attachment is made slightly concavo-convex, the convex side being disposed next the bottom of the comb. The attachment is preferably of spring metal so that when the screws 10 are tightened, the plate and the fins will be forced toward the comb so that the curved shape of the attachment will be entirely removed. Thus, it will be seen that by the simple expedient of grooving the fins and slightly curving the attachment, the former difficulty mentioned above is overcome.

In addition to the feature just described, it is desired to lay particular emphasis upon the shape of the bottom of the fins, since by forming them flat, a cut of the same depth will be had over the entire animal, thus leaving the wool all the same length. Were the bottom of these fins any other shape, it would be practically impossible to regulate the depth of the cut and thus after the sheep was sheared, it would present an extremely ragged appearance, the wool being various lengths upon different parts of its body.

I claim:

1. An article of the class described consisting of an attachment for shearing machines, said attachment being slightly concavo-convex and comprising an attaching plate, a fin formed on each end edge thereof and projecting beyond the front edge, and a plurality of relatively shorter fins formed integrally with and projecting forwardly from the front edge of said plate, all of said fins depending from the underside of said plate and having flat bottoms disposed in the same horizontal plane, each of said fins also having a longitudinally extending groove in its upper edge, said grooves being adapted to receive the bottom edges of a plurality of comb teeth of a shearing machine, said attachment being adapted to be disposed with its convex side toward the stationary cutter of the shearing machine.

2. The combination with a shearing machine including a stationary cutter having comb teeth thereon, the bottom edges of said teeth being thin; of an attachment therefor comprising an attaching plate, a fin formed on each end edge thereof, and a plurality of shorter fins formed on said plate and projecting forwardly from the front edge thereof, the upper edges of said fins being in the same horizontal plane, each having a longitudinally extending groove in said upper edge, said grooves receiving the thin bottom edges of a plurality of comb teeth, and means for clamping said attachment in engagement with said comb teeth.

3. The combination with a shearing machine including a stationary cutter having comb-teeth thereon, the bottom edges of said teeth being thin, and a pair of clamping screws for holding the parts of said machine together, of an attachment therefor, said attachment being slightly concavo-convex and comprising an attaching plate having coöperating attaching means to be engaged by said clamping screws, a fin formed on each end edge thereof, and a plurality of relatively shorter fins formed integrally with and projecting forwardly from the front edge of said plate, all of said fins depending from the underside of said plate and having flat bottoms disposed in the same horizontal plane, each of said fins also having a longitudinally extending groove in its upper edge to receive the thin bottom edges of a plurality of said comb-teeth, said attachment being disposed with its convex side toward said stationary cutter, whereby when said clamping screws are engaged with said coöperating attaching means and tightened, the fins will be clamped in engagement with said comb.

4. The combination with a shearing machine including a stationary cutter having comb teeth thereon, and a pair of clamping screws for holding the parts of said machine together; of an attachment therefor, said attachment being slightly concavo-convex and comprising an attaching plate having coöperating attaching means to be engaged by said clamping screws, a fin formed on each end edge thereof, and a plurality of relatively shorter fins formed integrally with and projecting forwardly from the front edge of said plate, all of said fins depending from the under side of said plate and having flat bottoms disposed in the same horizontal plane, the upper edges of said fins engaging the bottom edges of a number of said comb teeth, said attachment being disposed with the convex side toward said stationary cutter, whereby when said clamping screws are engaged with said coöperating attaching means and tightened, the attachment will be clamped in engagement with said comb.

In testimony whereof I have hereunto set my hand in the presence of two subscribing witnesses.

RUSSELL D. COOK.

Witnesses:
R. H. BREER,
G. A. MARR.